United States Patent [19]

Kwan et al.

[11] Patent Number: 5,147,237

[45] Date of Patent: * Sep. 15, 1992

[54] TOY AUDIO DEVICE

[75] Inventors: David C. K. Kwan; Ma H. Wai, both of Tsuen Wan, Hong Kong; Steven Lebensfeld, Woodsburgh, N.Y.; Harvey Goldberg, Thornhill, Canada

[73] Assignee: Toymax Inc., Cedarhurst, N.Y.

[ * ] Notice: The portion of the term of this patent subsequent to Dec. 17, 2008 has been disclaimed.

[21] Appl. No.: 805,536

[22] Filed: Dec. 11, 1991

Related U.S. Application Data

[63] Continuation of Ser. No. 613,613, Nov. 15, 1990, Pat. No. 5,092,810, which is a continuation-in-part of Ser. No. 602,150, Oct. 22, 1990, Pat. No. 5,073,140.

[51] Int. Cl.$^5$ ............................................. A63H 3/28
[52] U.S. Cl. .................................................... 446/297
[58] Field of Search ............... 446/297, 397, 303, 405, 446/298, 268; 434/335, 339, 308, 340, 169

[56] References Cited

U.S. PATENT DOCUMENTS

| | | |
|---|---|---|
| 3,354,577 | 11/1967 | Glass et al. |
| 3,394,493 | 7/1983 | Glass et al. |
| 3,866,035 | 2/1975 | Richey |
| 3,928,932 | 12/1975 | Maurer |
| 4,095,367 | 6/1978 | Ogawa ............................ 446/73 |
| 4,182,076 | 1/1980 | Gay et al. ...................... 446/353 |
| 4,267,551 | 5/1981 | Dankman et al. |
| 4,318,245 | 3/1982 | Stowell et al. |
| 4,327,518 | 5/1982 | Knauff .......................... 446/242 |
| 4,516,950 | 5/1985 | Berman et al. ............... 446/297 |
| 4,646,350 | 2/1987 | Batra ............................. 381/51 |
| 4,690,655 | 9/1987 | Bailey ............................ 446/84 |
| 4,696,654 | 9/1987 | Welch et al. ............... 446/405 X |
| 4,703,573 | 11/1987 | Montgomery et al. ...... 434/169 X |
| 4,723,931 | 2/1988 | Allen et al. .................. 446/268 |
| 4,741,717 | 5/1988 | Wolf ......................... 446/484 X |
| 4,791,741 | 12/1988 | Kondo ......................... 40/124.1 |
| 4,799,915 | 1/1989 | Lehmann et al. ............ 446/279 |
| 4,802,879 | 2/1989 | Rissman et al. ............. 446/175 |
| 4,809,335 | 2/1989 | Rumsey ......................... 381/53 |
| 4,820,233 | 4/1989 | Weiner .......................... 446/303 |
| 4,840,602 | 6/1989 | Rose ............................. 446/175 |
| 4,846,752 | 7/1989 | Combs .......................... 446/279 |
| 4,857,030 | 8/1989 | Rose ............................. 446/303 |
| 4,878,871 | 11/1989 | Noto ............................. 446/302 |
| 4,878,873 | 11/1989 | Yamaguchi et al. ......... 446/321 |
| 4,973,941 | 11/1990 | Davis et al. ............... 446/297 X |
| 5,037,345 | 8/1991 | Nakayama ................... 446/297 |

OTHER PUBLICATIONS 3 photographs of Hasbro G.I. Joe Sonic Fighter (photocopy).
1 Bubble Pack Card of Hasbro G.I. Joe Sonic Fighter (photocopy).

*Primary Examiner*—Mickey Yu
*Attorney, Agent, or Firm*—Rosen, Dainow & Jacobs

[57] ABSTRACT

A toy audio generating device is disclosed for use as an accessory to another toy, for example as a backpack for a toy action figure. The toy audio device includes a receptacle defining an enclosure containing a speaker and plural batteries laid out side-by-side adjacent the end of the speaker opposite the sound projecting portion of the speaker. A printed circuit board containing circuitry for generating audio signals is located in a space alongside the speaker under a side wall of the enclosure. A switch for activating sound generation is mounted to that side wall and directly contacts the printed circuit board.

25 Claims, 3 Drawing Sheets

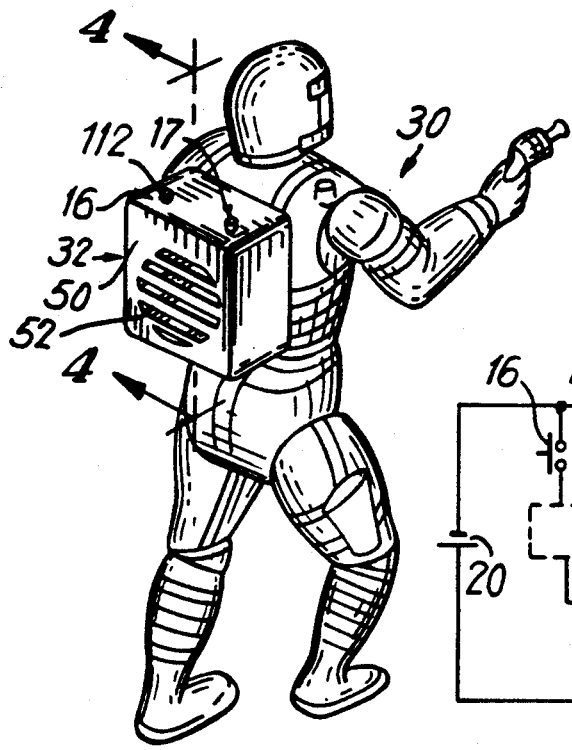
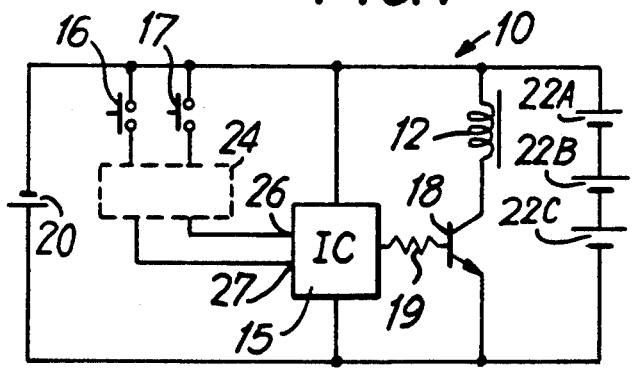
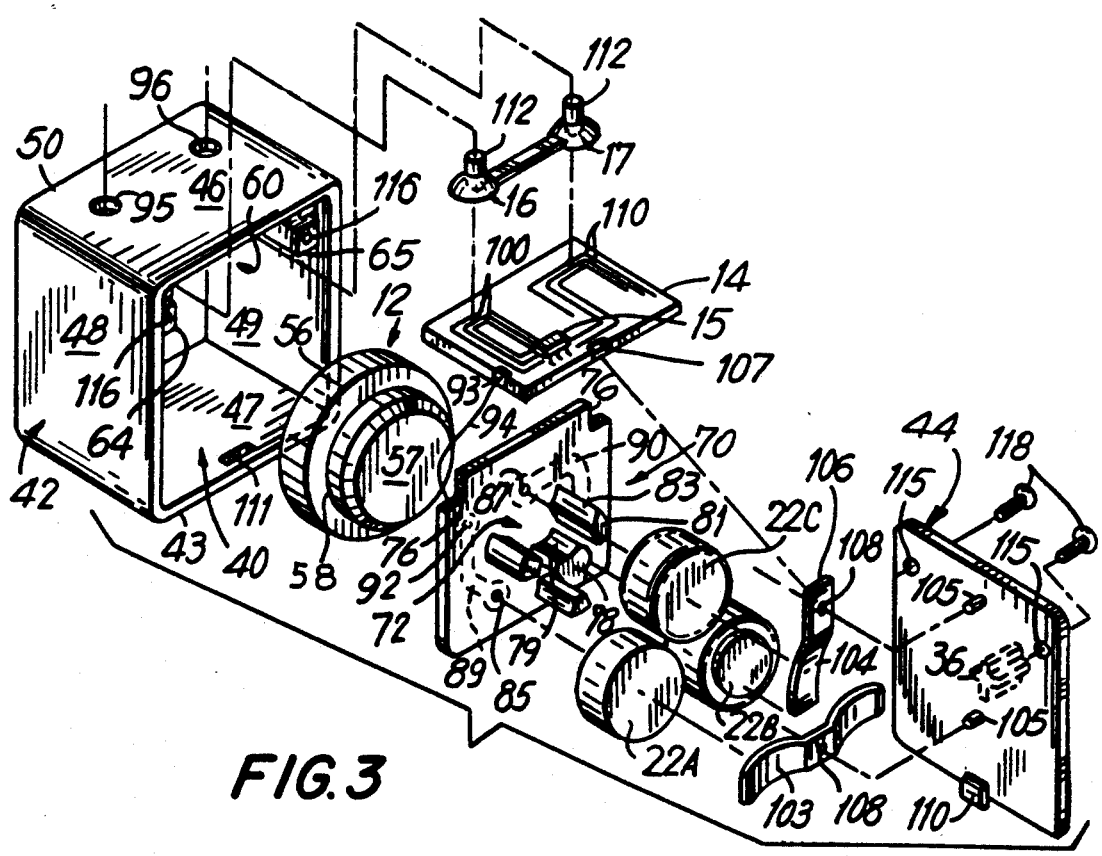

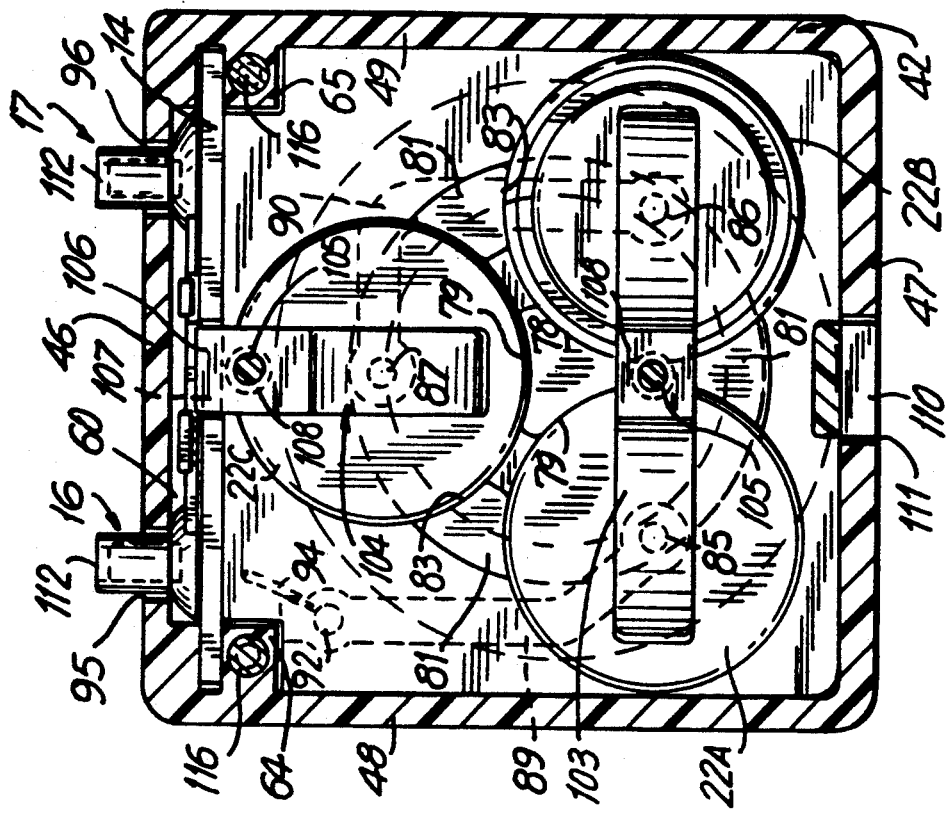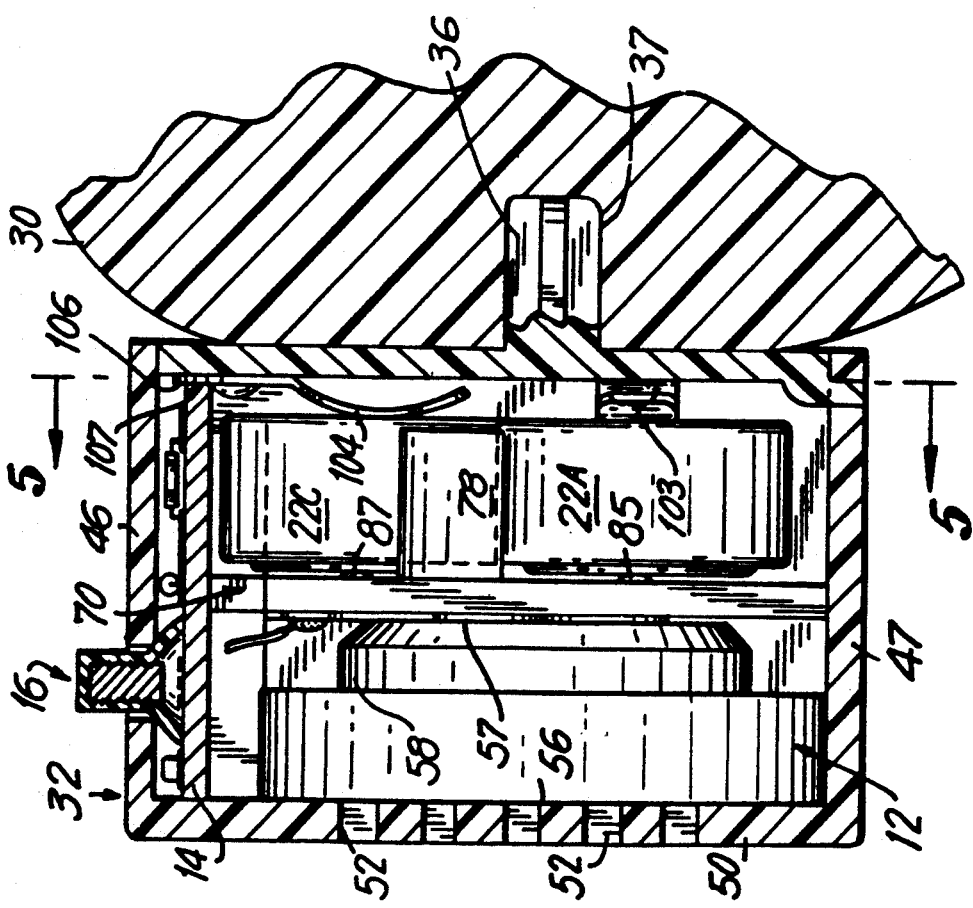

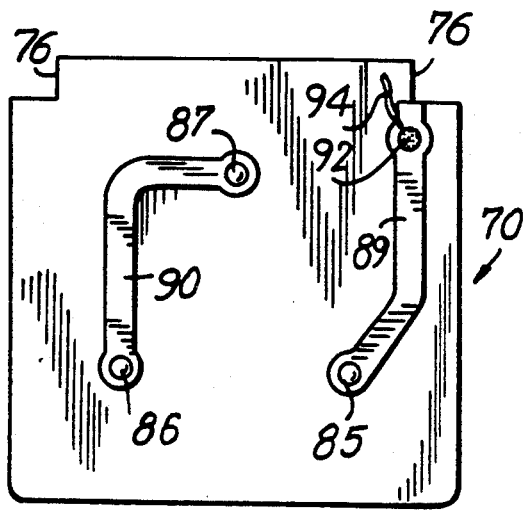
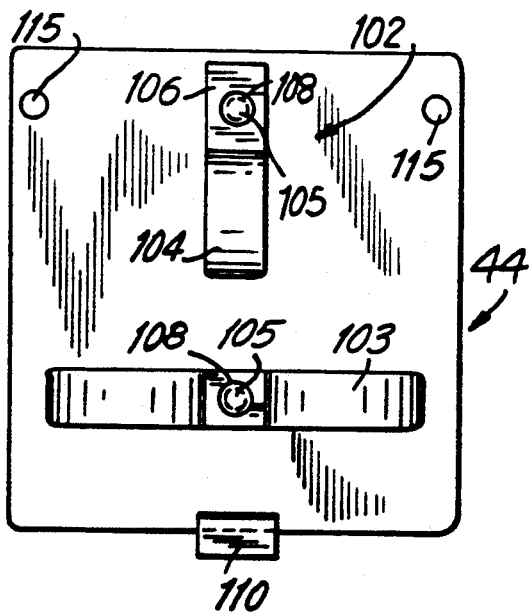
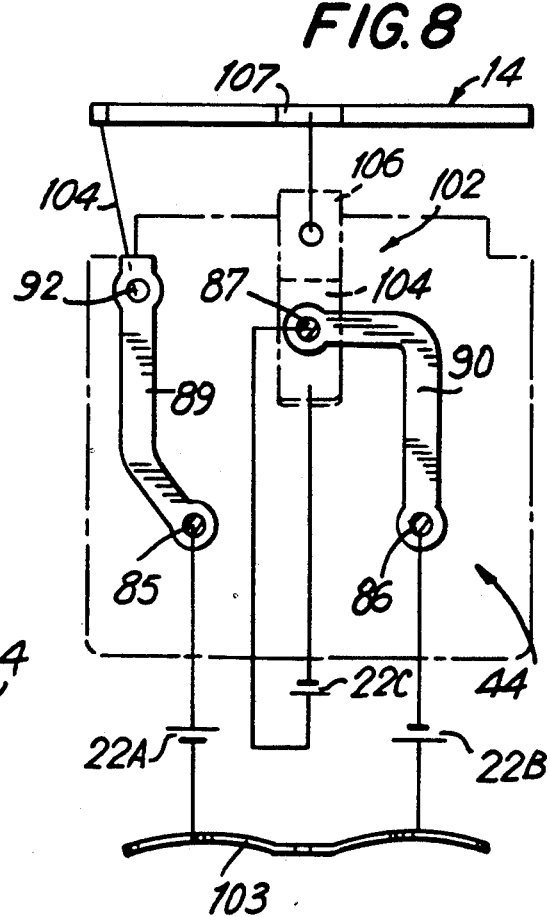

TOY AUDIO DEVICE

RELATED APPLICATION

This application is a continuation of copending application Ser. No. 07/613,613, titled "TOY AUDIO DEVICE", filed Nov. 15, 1990, now U.S. Pat. No. 5,092,810, which is a continuation-in-part of copending U.S. application Ser. No. 07/602,150, filed Oct. 22, 1990, entitled "TOY ACTION FIGURES AND SPEECH AND SOUND EFFECTS ACCESSORY THEREFOR", now U.S. Pat. No. 5,073,140.

BACKGROUND OF INVENTION

This invention related to a toy audio device, and in particular to an audio device adapted for detachable mounting on another toy.

Application Ser. No. 07/602,150, the disclosure of which is hereby incorporated by reference, describes an audio accessory for toys such as action figures and vehicles. Various embodiments of audio accessories are given in '150 patent application for toy action figures. In one embodiment, the accessory is configured as a backpack for snap-mounting on the back of the toy action figure. The accessory carries all the components of an audio generating system including in the interior of the accessory a speaker, a printed circuit board (PCB) and circuitry thereon, and a battery, and a switch accessible from the outside for activating the audio generating system.

A presently commercially-available backpack accessory for toy action figures supplies only sound effects. That backpack accessory comprises two receptacle halves each open at one end. The two receptacle halves when joined define a single enclosure in which is mounted an audio generating system. The audio generating system includes a PCB and a speaker which are mounted in one receptacle half and three batteries which are mounted in the other receptacle half offset from the speaker and PCB. The PCB is disposed extending parallel to the face of the speaker coil offset to one side of the speaker, with the coil partially disposed in a recess in an end of the PCB. Three button-cell batteries are provided mounted axially aligned extending in a row in a battery compartment adjacent to the end of the PCB opposite the end with the recess. Push button switches for activating the audio generating system project from the rear of the backpack. The speaker faces the front of the backpack, the backpack front being adjacent the action figure when the backpack is mounted to the back thereof.

The commercially-available backpack described above has certain limitations. For use with a 3¾ inches toy action figure, the backpack is bulky and disproportional to the toy action figure in height, width and thickness. Specifically, the backpack is wider and thicker than a typical 3¾ inches action figure, and is more than half the height of a 3¾ inches action figure. The speaker is positioned to project sound out of the front of the backpack which, when the backpack is mounted to the action figure, is closely adjacent the solid back of the action figure, which can affect sound volume and quality. That commercially-available backpack generates only sound effects, and a separate control is provided to activate a single selected sound effect per control.

SUMMARY OF INVENTION

An object of the invention disclosed herein is to provide an improved audio device, particularly one configured as a toy accessory for another toy.

Another object of the invention is to provide a less bulky audio device configured as a toy accessory for another toy.

Another object of the invention is to provide such toy audio devices as accessories for action figures, particularly toy audio devices which are better proportioned for use with 3¾ inches toy action figures.

These and further objects and advantages of the invention are achieved by providing a battery operated toy audio device comprising an audio generating apparatus or system which includes a plurality of disc-like batteries, audio generating circuitry, a speaker and at least one control for activating the audio generating system, and in which the batteries are disposed in a side-by-side grouping.

The batteries have opposed end faces and a side, and may be disposed in a grouping opposite from and overlapping an end of the speaker with no plane formed by the battery end faces intersecting the speaker, or in a grouping offset from an end of the speaker with no plane formed by the battery end faces intersecting the speaker, or in a grouping offset from an end of the speaker with a place formed by the battery end faces intersection the speaker. The batteries may be disposed on a same or on both sides of the plane. Alternatively, the batteries may be disposed in a grouping opposite from and overlapping a major surface of the PCB such that the plane formed by the battery end faces is parallel to the major surface of the PCB.

The batteries are so disposed to make it possible to provide a toy audio device having a reduced size in at least one dimension as compared to a comparable device having disc-like batteries which are axially aligned, typically in a separate battery compartment.

In the presently preferred embodiment, the toy audio device is a backpack for a toy action figure, and the battery grouping is located directly opposite the end of the speaker which is formed by the speaker coil. Both the speaker end formed by the coil and the opposite end which projects sound from the speaker define parallel speaker end faces. In this embodiment, the sound projecting end of the speaker is disposed facing the back of the backpack, and the batteries are disposed between the coil end of the speaker and the front of the backpack. Thus, in this backpack embodiment, the battery end faces extend in a vertical plane as does the sound projecting and coil end faces of the speaker. However, the sound projecting end face of the speaker may face the top or bottom of the backpack, in which case, the battery end faces will extend in a horizontal plane.

In another embodiment, the audio accessory may be a weapon and the particular disposition of the battery grouping will depend upon the size and configuration of the weapon.

With respect to the backpack accessory, providing the batteries laid out in a side-by-side flat grouping opposite and overlapping the speaker coil end face reduces the overall height of the backpack to bring it more into proportion with a smaller toy action figure such as the 3¾ inches size.

According to the invention, the accessory may comprise a single receptacle having an open end and a flat cover plate or lid therefor. With a single receptacle, all of the components are mounted in a common member including the batteries which are located adjacent the enclosure open end which is closed off by the lid. The lid is removable to provide easy access to the batteries for replacement purposes. Hence, the lid can be constructed as a relatively simple element for easy attachment and detachment from the receptacle member. In the case of a backpack accessory, this allows the speaker to be positioned with its sound generating end face facing the rear of the backpack (which does not face the toy action figure) for better sound projection with less sound volume reduction or distortion than if the speaker sound projecting end face faced the front of the accessory and the solid back of the action figure.

The PCB may be mounted in a number of ways depending upon the desired size and shape of the accessory. For example, the PCB may be mounted in a place perpendicular to the plane of the battery end faces to one side of the battery grouping and the speaker, or the PCB may be mounted parallel to the plane of the battery end faces and opposite and overlapping the battery grouping. In the case of the backpack accessory, as presently preferred, the PCB is mounted perpendicular to the plane of the battery end faces to one side of the battery grouping and the speaker.

The at least one control for activating the audio generating system comprises at least one manually operable switch. The preferred PCB mounting arrangement described above for the backpack accessory has the advantage that the switch can be mounted directly to the PCB or to directly contact the PCB (without wires) with the actuating portion or button of the switch extending from a side of the backpack, prefereably the top of the backpack relative to its mounting to a toy action figure. In the presently preferred embodiment the switch is of the conductive rubber type in which a conductive member is moved into and out of direct contacts with the PCB. Such a mounting arrangement with a switch button or buttons actuated from the top also helps reduce the overall thickness of the backpack accessory.

Another object of the invention is provide a toy audio device which generates a plurality of sound or speech phrases, or both, selectable by actuation of the same control.

Another object of the invention is to provide a toy audio device which generates a plurality of different sounds or different speech phrases, or both, by activation of the same control.

In a preferred embodiment, means are provided responsive to a single actuation of a common control to cause the audio generating system to generate various combinations of both a speech phrase and a sound effect.

The invention will now be described in greater detail with respect to preferred embodiments thereof, taken in conjunction with the accompanying drawings.

BRIEF DESCRIPTION OF THE DRAWINGS

The invention is illustrated by way of example and not limitation in the figures of the accompanying drawings in which like references denote the same or corresponding parts, and in which:

FIG. 1 is a schematic circuit diagram of sound generating circuitry contained within the backpack accessory depicted in FIG. 2;

FIG. 2 is a rear perspective view of a toy action figure having attached thereto a backpack accessory according to the invention including an audio generating system;

FIG. 3 is an exploded view of the backpack accessory of FIG. 2;

FIG. 4 is a sectional view of the backpack accessory of FIG. 2 taken along the line 4—4 of FIG. 2;

FIG. 5 is a sectional view of the backpack accessory of FIG. 2 taken along line 5—5 of FIG 4;

FIGS. 6 and 7 are respective plan views of the battery base plate and the lid of the backpack accessory depicted in FIG. 3; and FIG. 8 is a schematic view showing electrical interconnection of the batteries of the backpack accessory depicted in FIG. 3.

DESCRIPTION OF PREFERRED EMBODIMENTS

FIG. 1 shows schematically the circuitry for an audio generating system 10 for a toy audio device according to the invention. Audio generating system 10 comprises the following components: a speaker 12 or like electrical-to-sound transducer, a PCB 14 (FIG. 3) containing an integrated circuit (IC) 15 which combines speech and sound effects synthesizers as well as the logic or switching circuitry which responds to one or more externally actuated controls such as switches 16 and 17, a separate transistor 18 as an output amplifier, resistor 19, a capacitor 20 and batteries 22A-C for powering the audio generating system.

Resistor 19 may be 470 ohms and transistor 18 may be a type 90131. Transistor 18 and resistor 19 may be incorporated into IC 15. IC 15 may be a Windbond W52300 series ADPCM voice synthesizer. Speaker 12 may be of the type comprising a ferrite core coil which vibrates a mylar cone. The power rating of speaker 12 may be about 70 mw to 100 mw, and its size may be approximately 21 mm in diameter by 7 mm in height. Switches 16 and 17 may be micro-miniature switches of the conductive rubber type, which may be about 8 mm diameter and 7 mm in height. Further details of the components of audio generating system 10 are given in application Ser. No. 07/602,150.

Inexpensive miniature batteries 22A-C of the button-cell type are preferred. Since each battery of that type generates only 1.5 volts, and the audio generating circuitry (e.g., IC 15) typically requires at least about 4 volts, three batteries 22A-C connected in series providing 4.5 volts are required.

One aspect of the present invention relates to the layout of these components inside the accessory to reduce size and improve sound quality, and to enhance and facilitate use by a child.

FIG. 2 shows a typical articulated toy action figure 30 as a spaceman, carrying a backpack accessory 32 incorporating the audio generating system 10 in accordance with the invention. The invention is not limited to a spaceman action figure, or to articulated action figures, but is applicable to other figures. Also, the invention is not limited to figures portraying humans, but is also applicable to figures and objects which portray nonhumans, creatures and inanimate objects. For example, the invention is applicable to vehicles, e.g., land, sea, air and space vehicles. The invention is also not limited to backpack accessories, and is applicable to other accessories such as weapons, vehicle parts, and vehicle accessories to a "mother" vehicle.

The accessory has means for removably attaching it to the action figures or other toy object. In the case of a backpack or weapon accessory for an action figure, a projection and a receptacle, and other means described in application Ser. No. 07/602,150, may be provided for mounting the accessory to a toy action figure. Referring to FIG. 4, backpack 32 is provided with a projection 36 which snaps into a receptacle 37 in the back of the action figure 30.

FIGS. 3-5 illustrate the backpack 32 and the components of the audio generating system 10. Backpack 32 defines an enclosure 40 formed by a box-like receptacle 42. Receptacle 42 is open at one end 43. A lid 44 closes the open end 43 of receptacle 42 and the enclosure 40 therein. Receptacle 42 has side walls 46-49 and an end wall 50 which define enclosure 40. For convenience, receptacle side walls 46 and 47 may be referred to as the backpack top and bottom (or top and bottom walls), respectively, receptacle side walls 48 and 49 as the backpack sides or side walls, receptacle end wall 50 as the backpack rear or rear wall, and lid 44 as the backpack front or front wall. Rear wall 50 has slotted openings 52 (FIG. 4) to allow sound waves to emanate from enclosure 40.

The components of audio generating system 10 are mounted within enclosure 40 as follows. Speaker 12 is mounted with its cone or sound projecting part 56 adjacent and facing slotted openings 52 in rear wall 50, batteries 22A-C are mounted in a side-by-side generally flat grouping adjacent the flat end face 57 of coil or magnet 58 of speaker 12, and PCB 14 is mounted in a space 60 above speaker 12 and batteries 22A-C.

A shoulder 64 projects inwardly in enclosure 40 from side wall 48 spaced from top wall 46, and another shoulder 65 projects inwardly in enclosure 40 from side wall 49 spaced from top wall 46 the same distance as should 64. Each shoulder 64, 65 extends sufficiently from and sufficiently along the respective side wall to function as an opposed bracket for supporting PCB 14 thereon, and shoulders 64 and 65 are spaced sufficiently from top wall 46 to provide a clearance space 60 between shoulders 64, 65 and top wall 46 which can accommodate PCB 14 with circuit components thereon. Shoulders 64 and 65 extend from rear wall 50 the full extend of side walls 48 and 49, respectively, less the thickness of lid 44 so that lid 44 when mounted to receptacle 42 is flush with the edge of side walls 48 and 49.

Speaker 12 is mounted in enclosure 40 so that the cone or sound-generating part 56 thereof is adjacent and faces slotted openings 52, and speaker coil or magnet 58 is facing the front of the backpack. Sound projecting part 56 ends in a plane defining a face 68 having a peripheral edge. The speaker faces 57 and 68 are the end faces of speaker 12 and extend parallel to each other. An adhesive may be used between the peripheral edge of the sound-projecting part 56 of speaker 12 and rear wall 50 to mount the speaker to rear wall 50.

A base plate 70 having mechanical structure 72 for positioning and holding batteries 22A-C is disposed adjacent speaker coil 58 extending parallel to face 57 thereof, and parallel to front and rear walls 46, 47, i.e., extending vertically in FIGS. 2 and 3. Battery base plate 70 has cutouts 76 at the top thereof to accommodate shoulders 64, 65 and is configured to fit snugly within enclosure 40. The mechanical structure 72 of base plate 70 which receives and supports three button-cell batteries 22A-C in a flat, side-by-side equilateral triangle grouping comprises a center post 78 with three curved side surfaces 79 to accommodate a circular edge portion of each battery 22A-C, and three surrounding shorter posts 81 each with three curved side surfaces 83 to accommodate another circular edge portion of each battery 22A-C.

Referring to FIGS. 3 and 6, base plate 70 also includes electrical contacts 85-87 mounted thereon to contact one terminal of each of the three batteries 22A-C. Printed circuit traces 89 and 90 for the battery interconnections are located on the back side of the plate 70. Trace 89 at the left connects the lower left contact 85 for battery 22A to a point 92, which in turn is connected to a point 93 on PCB 14 by a wire 94. Trace 90 at the right connects the battery contacts 85 and 86 for batteries 22B and 22C.

PCB 14 having mounted thereto IC 15 and other necessary components (not shown) such as a transistor 18 discrete capacitor 20 and resistor 19 is positioned in space 60 above the shoulders 64 and 65 as described above. Top wall 46 has apertures 16, 17 positioned over PCB 14. These apertures 95, 96 receive switches 16, 17, of the conductive rubber (or insulating rubber with a conductive insert) type. PCB 14 has spaced traces 100 underlying each switch 97, 98. When the button 112 of a switch 16, 17, is pressed, a conductive portion of the pressed switch shorts across the spaced traces 100 to effect a switching function.

Referring to FIGS. 3 and 7, further structure 102 for holding and electrically connecting batteries 22A-C is mounted on inside of lid 44. Structure 102 comprises battery contact springs 103 and 104 mounted to lid 44 by pins 105 snap fitted into files 108 in springs 103 and 104. As shown schematically in FIG. 8, the bottom contact spring 103 interconnects the facing negative side of battery 22A with the facing positive side of inverted battery 22B. The upper contact spring 104 interconnects the negative side of battery 22C and a contact point 107 on PCB 14. The upper edge 106 of spring 104 make direct contact with point 107 when the various components are assembled into receptacle 42 (FIG. 4).

Lid 44 has a configured tab 110 (FIGS. 3 and 7) at the bottom edge thereof, and bottom wall 47 of receptacle 40 has a complementary opening 111 therein sized to received projection 110 in snap-lock fashion. Two screw holes 115 are provided at the top of lid 44, and shoulders 64 and 65 have threaded holes 116 therein for receiving screws 118. Thus, lid 44 is secured to receptacle 40 by the screws 118 and the snap-locking of tab 110 in opening 111.

Backpack 32 is assembled as follows. Speaker 12 is secured to receptacle 40 as described above. Point 93 of PCB 14 is connected to point 92 contact 85 on trace 89 by wire 94. Switches, 16, 17, are positioned with their activating buttons 112 protruding through holes 95, 96. PCB 14 is mounted in space 60 with base plate 70 extending adjacent and parallel to speaker coil end face 57. Batteries 22A-C are inserted between posts 78 and 81 in the equilateral triangle grouping defined by posts 81. Lid 44 is screwed and snap-locked to receptacle 40 as described above.

When lid 44 is assembled to receptacle 40, the contact springs 103, 104 make contact with and press the batteries 22A-C against base plate 70. A snug fit between the lid 44 and the base plate 70 is provided so that the batteries 22A-C are firmly urged against the base plate 70 by spring action which prevents front-to-rear movement of the batteries. Up-down and side-to-side movement of the batteries is prevented by a snug fit of the batteries between the side walls 28, 29 and wherein the top wall 26 and posts 81.

The combination of the spring contacts 103, 104, the traces, 89, 90, the battery arrangement with one battery 22B inverted, provide in a very simple and economic manner the necessary 4.5 volts to the PCB 14 to power the circuitry thereon. Arranging the batteries side-by-side in the flat grouping shown consumes less space than the known axially aligned arrangement referred to above.

By causing certain components to provide multiple functions, a more compact audio accessory has been provided. For example, the base plate 70 not only isolates batteries 22A–C from speaker 12, but also serves as a PCB to serially interconnect batteries 22A–C in cooperation with contact springs 103, 104. Similarly, contact springs 103, 104 not only contribute to the serial interconnection of the batteries, but also assure good electrical contact thereto while assisting in maintaining the batteries in position.

The provision of PCB 14 on top, parallel to and under the top wall 46, allows switches 16, 17 to be conveniently places on top where they are easily accessible for activation of the sound generating system. The use of two screws 18 and tab 110 to hold the lid 44 in place automatically complete the mechanical assembly of the enclosure, and also ensures that the PCB and the batteries are properly anchored.

In the embodiment illustrated, two separate switches 16, 17 are provided, a first to activate the circuitry to provide a first verbal expression and/or sound effect, and a second to activate the circuitry to provide a second verbal expression and/or sound effect. Closing switches 16 and 17 in given sequences or holding a switch activated for a given time causes audio generating system 10 to sound speech phrases and/or sound effects in various combinations. The logic for achieving such variation in the preferred embodiment is mask programmed into chip 15, or alternatively provided by optional logic circuit 24, or both. In the preferred embodiment, IC 15 is a Windbond W52300 Series ADPCM voice synthesizer. That IC includes four trigger inputs, two of which 26 and 27 are designed in FIG. 1. IC 15 includes a read only memory (ROM) which can be partitioned into four sections, each of which can be read out in response to given trigger inputs according to the mask programming of the chip.

IC 15 may be mask programmed to operate in a direct trigger mode in which a sound effect or speech phrase is sounded only upon activation of a switch, or in a serial-trigger mode in which a single actuation of a switch causes a series of speech phrases and/or sound effects to be sounded. In the direct trigger mode, each switch actuation may cause the same or a different sound to be generated.

In the preferred embodiment, IC 15 is mask programmed in the serial trigger mode to sound a speech phrase followed by a sound effect for each actuation of a switch. With two switches 16, 17 and a four ROM partition, actuation of switch 16 will cause a first speech phrase and first sound effect to be sounded, and actuation of switch 17 will cause a second speech phrase and a second sound effect to be sounded. For example, for a spaceman toy action figure, actuation of switch 16 causes audio system 10 to sound "check it out.", followed by a spaceship sound effect, and actuation of switch 17 causes audio generating system 10 to sound "they're moving" followed by a large vehicle sound.

While the invention has been described and illustrated in connection with preferred embodiments, many variations and modifications as will be evident to those skilled in this art may be made therein without departing from the spirit and scope of the invention. The invention as set forth in the appended claims is thus not to be limited to the precise details of construction set forth above and such variations and modifications are intended to be included within the scope of the appended claims.

What is claimed is:

1. A toy audio device configured as an accessory for a toy action figure attachable to, attached to or forming part of the toy action figure, said accessory having a configuration and visual appearance which are coordinated with the configuration and visual appearance of the toy action figure, said device comprising an audio generating system including circuitry comprising an integrated circuit, a switch coupled to said circuitry, at least one battery coupled at least to said circuitry and a speaker coupled to said circuitry, said integrated circuit including read only memory storing signals representing at least one speech phrase and at least one sound effect, said circuitry in response to a single actuation of said switch causing said memory to provide signals representing both said speech phrase and said sound effect, and said circuitry to provide audio signals to said speaker representing said speech phrase and said sound effect.

2. A toy audio device configured as an accessory for a toy action figure attachable to, attached to or forming part of the toy action figure, said accessory having a configuration and visual appearance which are coordinated with the configuration and visual appearance of the toy action figure, said device comprising an audio generating system including circuitry comprising an integrated circuit, a switch coupled to said circuitry, at least one battery coupled at least to said circuitry and a speaker coupled to said integrated circuit, said integrated circuit including read only memory storing signals representing at least one speech phrase and at least one sound effect, said integrated circuit in response to a first actuation of said switch causing said memory to provide signals representing said speech phrase and in response to a second actuation of said switch causing said memory to provide signals representing said sound effect, and said circuitry to provide audio signals to said speaker representing said speech phrase in response to said first actuation and to provide audio signals to said speaker representing said sound effects in response to said second actuation.

3. A toy comprising, in combination:
   a toy action figure having a given configuration and visual appearance; and
   an accessory attachable to, attached to or forming a part of said toy action figure, said accessory having a configuration and visual appearance which are coordinated with the configuration and visual appearance of said toy action figure;
   said accessory including audio generating apparatus for generating speech and sound effects, said audio generating apparatus comprising at least one selectively actuable control for causing said audio generating apparatus to generate said speech and sound effects, said generating apparatus being carried entirely by said accessory.

4. The toy of claim 3 wherein a first said control is coupled to said audio generating apparatus, and said audio generating apparatus is configured, so as to generate at least one speech pattern and at least one sound effects pattern upon one or more activations of said first control.

5. The toy of claim 3 wherein a first said control is coupled to said audio generating apparatus and said audio generating apparatus is configured, so as to generate at least one speech pattern and at least one sound effects pattern in response to a single activation of said first control.

6. The toy of claim 3 wherein said audio generating apparatus comprises a plurality of selectively actuable controls, at least one said control being coupled to cause said audio generating apparatus to generate ate least one speech pattern, and at least one said control being coupled to cause said audio generating apparatus to generate at least one sound effects pattern, said audio generating apparatus generating said speech and sound effects patterns independently of each other in response to activation of the respective control.

7. The toy of claim 3 wherein said control comprises a manually actuable switch.

8. The toy of claim 3 wherein said audio generating apparatus further comprises a sound synthesizer and a speaker.

9. The toy of claim 8 wherein said sound synthesizer comprises ROM programmed to generate said at least one speech pattern and said at least one sound effects pattern.

10. The toy of claim 9 wherein said sound synthesizer consists of a single integrated circuit.

11. The toy of claim 9 wherein said audio generating apparatus comprises at least two selectively actuable controls and wherein said ROM is partitioned and configured so as to store said at least one speech pattern and said at least one sound effects pattern to be independently readable, said at least two controls being operable to cause said audio generating apparatus to independently generate said at least one speech pattern stored in said ROM upon activation of a first of said at least two controls and said at least one sound effects pattern stored in said ROM upon activation of another of said at least two controls.

12. The toy of claim 9 wherein said ROM is partitioned and configured so as to store said at least one speech pattern and said at least one sound effects pattern to be independently readable, and wherein said audio generating apparatus is configured so that at least one speech pattern and at least one sound effects pattern may be sounded in at least one desired sequence by activation of a same control.

13. The toy of claim 9 wherein a first said control is coupled to said audio generating apparatus and said audio generating apparatus is configured, so as to generate at least one speech pattern from a first partitioned part of said ROM and at least one sound effects pattern from a second partitioned part of said ROM upon a single activation of said first control.

14. The toy of claim 3 wherein said accessory is configured and has the visual appearance of a backpack or a weapon.

15. An accessory for a toy action figure which generates at least one speech pattern and at least one sound effects pattern, said accessory having a configuration and visual appearance which are coordinated with the configuration and visual appearance of the toy action figure, said accessory being attachable to, attached to or forming part of the toy action figure and including audio generating apparatus for generating said at least one speech pattern and said at least one sound effects pattern, said audio generating apparatus comprising at least one selectively actuable control for causing said audio-generating apparatus to generate a said speech pattern and a said sound effects pattern, said audio generating apparatus being carried entirely by said accessory.

16. The accessory of claim 15 wherein a first said control is coupled to said audio generating apparatus and said audio generating apparatus is configured, so as to generate at least one speech pattern and at least one sound effects pattern upon one or more activations of said first control.

17. The accessory of claim 15 wherein a first said control is coupled to said audio generating apparatus and said audio generating apparatus is configured, so as to generate at least one speech pattern and at least one sound effects pattern in response to a single activation of said first control.

18. The accessory of claim 15 wherein said audio generating apparatus comprises a plurality of selectively actuable controls, at least one said control being coupled to cause said audio generating apparatus to generate said at least one speech pattern, and at least one said control being coupled to cause said audio generating apparatus to generate said at least one sound effects pattern, said audio generating apparatus generating said speech and sound effects pattern independently of each other in response to actuation of the respective control.

19. The accessory of claim 15 wherein said control comprises a manually actuable switch.

20. The accessory of claim 15 wherein said audio generating apparatus further comprises a sound synthesizer and a speaker.

21. The accessory of claim 20 wherein said sound synthesizer comprises ROM programmed to generate said at least one speech pattern, and said at least one sound effects patterns.

22. The toy of claim 21 wherein said sound synthesizer consists of a single integrated circuit.

23. The toy of claim 21 wherein said audio generating apparatus comprises at least two selectively actuable controls and wherein said ROM is partitioned and configured so as to store said at least one speech pattern and said at least one sound effects pattern so as to be independently readable, said at least two controls being operable to cause said audio generating apparatus to independently generate said at least one speech pattern stored on said ROM in response to activation of a first of said at least two controls and at least one sound effects pattern stored in said ROM in response to activation of another of said at least two controls.

24. The accessory of claim 21 wherein said ROM is partitioned and configured so as to store said at least one speech pattern and said at least one sound effects pattern to be independently readable, and wherein said audio generating apparatus is configured so that at least one speech pattern and at least one sound effects pattern may be sounded in at least one desired sequence by activation of a same control.

25. The accessory of claim 24 wherein a first said control is coupled to said audio generating apparatus and said audio generating apparatus is configured, so as to generate at least one speech pattern from a first partitioned part of said ROM and at least one sound effects pattern from a second partitioned part of said ROM upon a single activation of said first control.

* * * * *

UNITED STATES PATENT AND TRADEMARK OFFICE
CERTIFICATE OF CORRECTION

PATENT NO. : 5,147,237
DATED : Sept. 15, 1992
INVENTOR(S) : David C. K. Kwan et al It is certified that error appears in the above-indentified patent and that said Letters Patent is hereby corrected as shown below:

```
Col. 3, line 17, delete "place" and insert --plane--;

line 42, after "is" insert --to--.

Col. 6, line 31, delete "files" and insert --holes--.

Col. 7, line 26, change "complete" to --completes--;

line 27, change "ensures" to --assures--;

line 40, change "circuit" to --circuitry--.

Col. 8, line 57, change "are" to --is--.

Col. 9, line 64, change "are" to --is--.

Col. 10, line 38, change "patterns" to --pattern--.
```

Signed and Sealed this

Third Day of May, 1994

*Attest:*

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 5,147,237
DATED : September 15, 1992
INVENTOR(S) : David C.K. Kwan et al.

It is certified that error appears in the above-indentified patent and that said Letters Patent is hereby corrected as shown below:

Title page item [73]: change "Assignee: Toymax Inc., Cedarhurst, N.Y." to --Steven Lebensfeld, Woodsburgh, N.Y.; Harvey Goldberg, Thornhill, Canada; David C.K. Kwan, Tsuen Wan, Hong Kong--.

Signed and Sealed this

Twenty-ninth Day of November, 1994

Attest:

BRUCE LEHMAN

*Attesting Officer*    *Commissioner of Patents and Trademarks*